United States Patent
Belmonte et al.

(10) Patent No.: US 9,708,917 B2
(45) Date of Patent: Jul. 18, 2017

(54) TURBINE ENGINE PART FORMING A COMPRESSOR STATOR OR A TURBINE NOZZLE, AND METHOD FOR FABRICATING SAME

(75) Inventors: Olivier Belmonte, Perthes En Gatinais (FR); Julien Foll, Lucy (FR)

(73) Assignee: SNECMA, Paris (FR)

(*) Notice: Subject to any disclaimer, the term of this patent is extended or adjusted under 35 U.S.C. 154(b) by 703 days.

(21) Appl. No.: 14/127,989

(22) PCT Filed: Jun. 20, 2012

(86) PCT No.: PCT/FR2012/051387
§ 371 (c)(1),
(2), (4) Date: Dec. 20, 2013

(87) PCT Pub. No.: WO2012/175867
PCT Pub. Date: Dec. 27, 2012

(65) Prior Publication Data
US 2014/0133989 A1 May 15, 2014

(30) Foreign Application Priority Data
Jun. 21, 2011 (FR) .................................... 11 55430

(51) Int. Cl.
*F01D 5/22* (2006.01)
*F01D 5/28* (2006.01)
(Continued)

(52) U.S. Cl.
CPC ............ *F01D 5/225* (2013.01); *C04B 35/563* (2013.01); *C04B 35/565* (2013.01);
(Continued)

(58) Field of Classification Search
CPC ................... F05D 2240/128; F05D 2300/6034
See application file for complete search history.

(56) References Cited

U.S. PATENT DOCUMENTS 3,632,460 A 1/1972 Palfreyman et al.
4,786,347 A * 11/1988 Angus ................. B29C 45/0005
156/172
(Continued)

FOREIGN PATENT DOCUMENTS

| FR | 2 946 999 | 12/2010 |
| FR | 2 953 885 | 6/2011 |
| WO | 91 15357 | 10/1991 |

OTHER PUBLICATIONS

International Search Report Issued Oct. 22, 2012 in PCT/FR12/051387 Filed Jun. 20, 2012.

*Primary Examiner* — Craig Kim
*Assistant Examiner* — Jason Davis
(74) *Attorney, Agent, or Firm* — Oblon, McClelland, Maier & Neustadt, L.L.P.

(57) ABSTRACT

A turbine engine part forming a compressor stator or a turbine nozzle and including an inner shroud, an outer shroud, and vanes extending substantially radially between the inner and outer shrouds and being secured thereto. The part is made of composite material and is obtained by densifying a fiber preform with a matrix. The fiber preform includes a set of yarns extending continuously along a path passing longitudinally along the preform portions of at least two consecutive vanes by passing through the inner shroud preform portion and the outer shroud preform portion, and the woven fiber reinforcement yarns extends continuously in the circumferential direction along an inner shroud segment and along an outer shroud segment between which the consecutive vanes extend.

18 Claims, 8 Drawing Sheets

(51) Int. Cl.
*F01D 9/02* (2006.01)
*F04D 29/54* (2006.01)
*F01D 9/04* (2006.01)
*C04B 35/563* (2006.01)
*C04B 35/565* (2006.01)
*C04B 35/571* (2006.01)
*C04B 35/628* (2006.01)
*C04B 35/80* (2006.01)
*B29C 70/24* (2006.01)
*B29B 11/16* (2006.01)

(52) U.S. Cl.
CPC ...... *C04B 35/571* (2013.01); *C04B 35/62868* (2013.01); *C04B 35/62873* (2013.01); *C04B 35/62884* (2013.01); *C04B 35/62897* (2013.01); *C04B 35/806* (2013.01); *F01D 5/282* (2013.01); *F01D 9/02* (2013.01); *F01D 9/04* (2013.01); *F04D 29/542* (2013.01); *B29B 11/16* (2013.01); *B29C 70/24* (2013.01); *C04B 2235/48* (2013.01); *C04B 2235/483* (2013.01); *C04B 2235/5208* (2013.01); *C04B 2235/5248* (2013.01); *C04B 2235/614* (2013.01); *C04B 2235/616* (2013.01); *F05D 2300/21* (2013.01); *F05D 2300/603* (2013.01); *F05D 2300/6012* (2013.01); *Y10T 29/4932* (2015.01)

(56) References Cited

U.S. PATENT DOCUMENTS

2010/0166545 A1* 7/2010 Schuler .................... F01D 5/24
                                                            415/189
2012/0099982 A1    4/2012 Coupe et al.

* cited by examiner

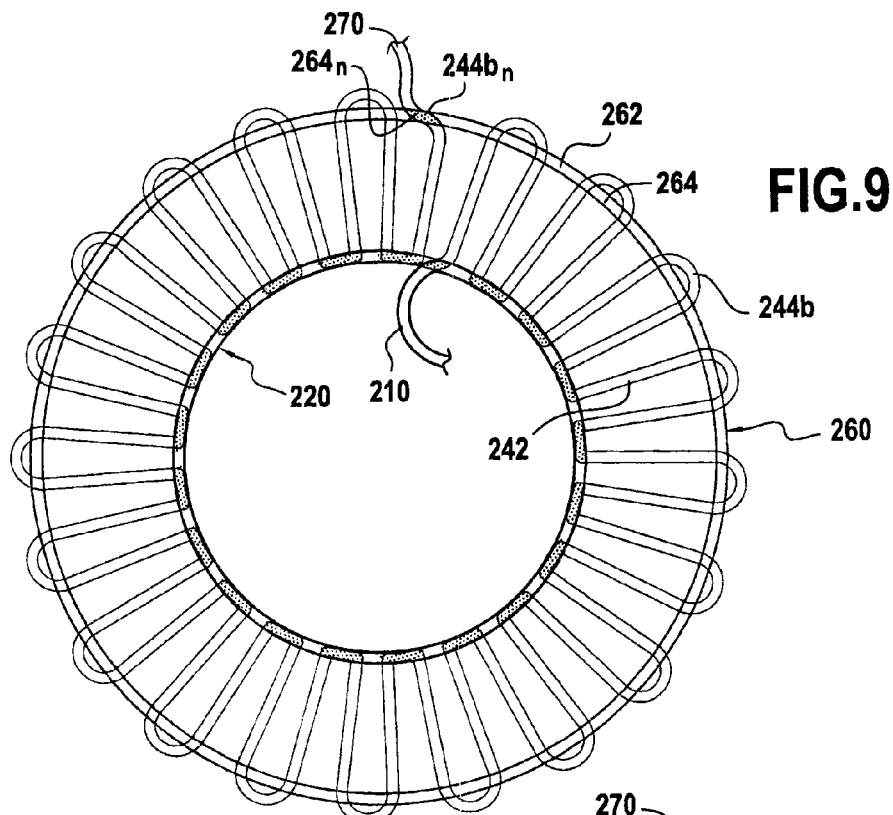
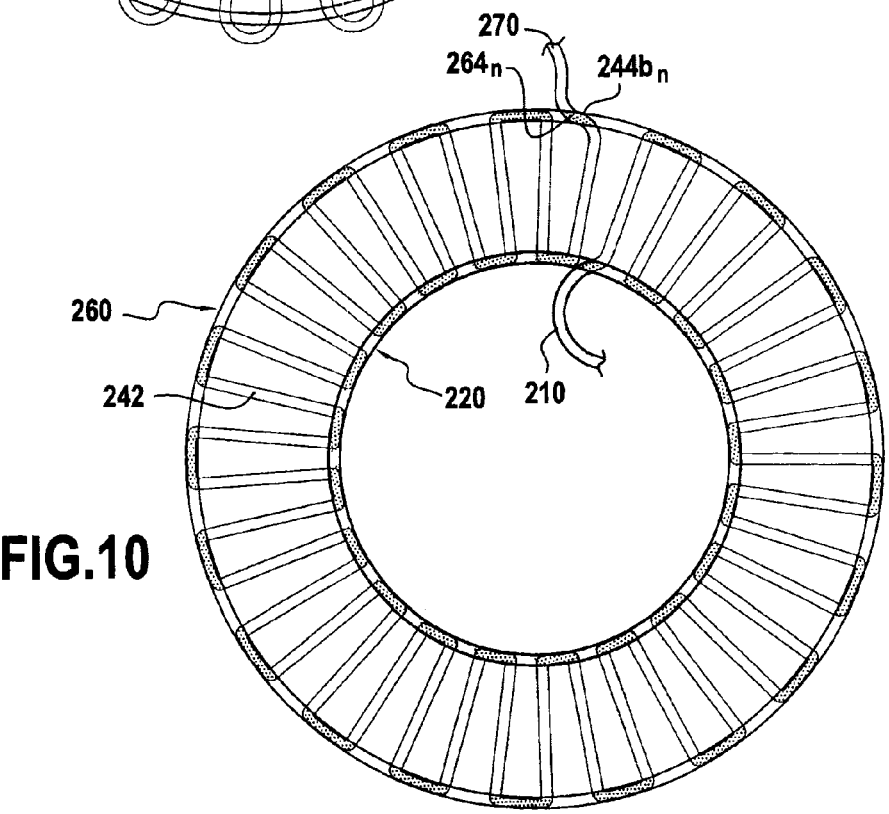

TURBINE ENGINE PART FORMING A COMPRESSOR STATOR OR A TURBINE NOZZLE, AND METHOD FOR FABRICATING SAME

BACKGROUND OF THE INVENTION

The invention relates to turbine engine parts forming compressor stators or turbine nozzles. The field of application of the invention is in particular that of aeroengines. Nevertheless, the invention is also applicable to other turbine engines, e.g. industrial gas turbines.

In turbine engines, the compressor and turbine modules comprise rotary wheels alternating with stators in compressors or with nozzles in turbines.

A traditional compressor stator in widespread use comprises a plurality of guide vanes, e.g. fastened by welding to an outer ring that has a structural function and that defines the outside of the air flow passage. On the inside, the air flow passage is defined by a non-structural inner shroud. The outer ring, the vanes, and the inner shroud are typically made of metal.

A conventional turbine nozzle is commonly made up of a plurality of metal sectors, each obtained as a single part by casting and each comprising an outer shroud sector defining the outside of the gas flow passage, an inner shroud sector defining the inside of the gas flow passage, and vanes connecting together the outer and inner shroud sectors.

The use of composite materials comprising fiber reinforcement densified by a matrix has already been proposed for various turbine engine parts, and in particular rotary wheel airfoils, turbine rings, turbine nozzle elements, or after-body elements. For parts that are exposed in operation to high temperatures, it is recommended to use a ceramic matrix composite (CMC) material. The fabrication of such parts comprises making a fiber preform forming the fiber reinforcement of the composite material and having a shape close to the shape of the part that is to be fabricated, and then densifying the fiber preform with a matrix. The fiber preform may be obtained using various textile processes, in particular shaping a fiber blank that is made by multilayer or three-dimensional weaving.

Such composite material parts are remarkable in that they present good mechanical properties, at least comparable to those of similar metal parts, but associated with lower weight, and when CMC materials are used, these parts conserve their mechanical properties at very high temperatures and they are therefore suitable for use when it is desired to reach the highest possible operating temperatures for turbine engines in order to improve efficiency and reduce polluting emissions.

Thus, document EP 1 526 285 describes making a fan blade by densifying a fiber preform obtained by three-dimensional weaving with an organic matrix. Documents WO 2010/061140 and WO 2010/103213 respectively describe making blades with incorporated inner and/or outer platforms and turbine ring sectors out of CMC material using fiber blanks made by multilayer weaving.

Document WO 2010/146288 describes a CMC turbine nozzle element made up of inner shroud sectors and of outer shroud sectors together with vanes extending between the sectors and obtained by a multilayer woven fiber blank with continuity of the fiber reinforcement throughout the volume of the nozzle element. The fiber reinforcement includes yarns that extend continuously along two vanes by passing via the inner shroud sector or the outer shroud sector, but said yarns are subsequently interrupted. In addition, there is no continuity of the yarns of the fiber reinforcement in the circumferential direction along each of the inner and outer shroud sectors.

Document WO 91/15357 describes folding a knitted fiber blank concertina-wise so as to make a nozzle sector having a plurality of vanes. Nevertheless, the folding is such that it likewise does not make it possible to ensure continuity of the fiber reinforcement in the circumferential direction along the outer shroud sector and along the inner shroud sector.

OBJECT AND SUMMARY OF THE INVENTION

An object of the invention is to provide a turbine engine part forming a compressor stator or a turbine nozzle that is made of composite material and that presents good mechanical properties.

This object is achieved by a part comprising an inner shroud, an outer shroud, and vanes extending substantially radially between the inner and outer shrouds and being secured thereto, in which part the inner shroud, the outer shroud, and the vanes are made of composite material having woven fiber reinforcement densified by a matrix, and the fiber reinforcement includes a set of yarns extending continuously along a path traveling longitudinally through at least two consecutive vanes and passing through the inner shroud and the outer shroud, said at least two consecutive vanes extending between an inner shroud segment and an outer shroud segment with yarns of the woven fiber reinforcement extending continuously in the circumferential direction along the inner shroud segment and with yarns of the woven fiber reinforcement extending continuously in the circumferential direction along the outer shroud segment.

The fiber reinforcement may include a set of yarns extending continuously along a path passing longitudinally through at least three consecutive vanes and passing in alternation through the inner shroud and the outer shroud, said at least three consecutive vanes extending between an inner shroud segment and an outer shroud segment with yarns of the woven fiber reinforcement extending continuously in the circumferential direction along the inner shroud segment and with yarns of the woven fiber reinforcement extending continuously in the circumferential direction along the outer shroud segment.

The continuity of the yarns of the fiber reinforcement contributes to imparting good mechanical strength. Depending on conditions of use, the part may be made of organic matrix composite material or of CMC material.

Advantageously, the inner shroud, the outer shroud, and the vanes form a single part made of composite material.

Under such circumstances, the fiber reinforcement includes a set of yarns extending continuously along a path passing along one of the inner and outer shrouds along its circumference, and then successively through all of the vanes, and then along the other one of the inner and outer shrouds along its circumference.

In a variant, the turbine engine part is made up of a plurality of sectors, each sector forming a single part of composite material having an inner shroud sector, an outer shroud sector, and at least two vanes, or indeed at least three vanes, extending between the shroud sectors and secured thereto.

In a particular embodiment, the turbine engine part may include at least one flange secured to the outer shroud and extending radially outwards therefrom.

According to another embodiment feature, the turbine engine part may include wall portions secured to the inner shroud and defining on the inside thereof a housing of substantially channel section that is open towards the inside.

The invention also seeks to propose a method enabling such a turbine engine part to be fabricated from a single-piece fiber preform.

This object is achieved by a method comprising:
making a woven fiber preform including a first set of yarns that pass continuously along the circumference of a first preform portion forming a preform for the inner shroud, and then successively in a longitudinal direction along second preform portions forming vane preforms, and also circumferentially along a third preform portion forming an outer shroud preform, the yarns of the first set of yarns passing in succession along said second preform portions by passing from one second preform portion to the next in alternation through the first preform portion and through the third preform portion; and
densifying the fiber preform with a matrix.

In a particular implementation of the method, the making of the fiber preform comprises:

1) weaving a fiber strip with a first set of yarns extending continuously in the longitudinal direction of the strip and comprising a plurality of layers of parallel yarns, and a second set of yarns woven with the yarns of the first set along woven segments of the fiber strip that are separated from one another by non-woven segments, the fiber strip comprising:
   a first fiber strip portion extending over a length corresponding to the length of the first preform portion, the first fiber strip portion being made up of woven segments alternating with non-woven segments;
   a second fiber strip portion immediately following the first portion and made up of woven segments alternating with non-woven segments, the woven segments of the second fiber strip portion corresponding to the second preform portions and having a length corresponding to the longitudinal dimension of the vanes, and the non-woven segments of the second fiber strip portion forming connection portions between consecutive vane preforms; and
   a third fiber strip portion immediately following the second portion and extending over a length corresponding to the length of the third preform portion, the third fiber strip portion being made up of woven segments alternating with non-woven segments;
   the total number of woven and non-woven segments in each of the first and third portions being equal to the number of vanes; and 2) shaping the fiber strip, comprising:
   rolling up the first fiber strip portion;
   folding the second fiber strip portion so as to place its woven segments substantially radially relative to the rolled-up first fiber strip portion; and
   rolling up the third fiber strip portion;
   the non-woven segments of the second fiber strip portion that form connection portions between consecutive vane preforms being engaged through the non-woven segments in alternation in the rolled-up first fiber strip portion and in the rolled-up third fiber strip portion.

Under such circumstances, after engaging a non-woven segment of the second fiber strip portion forming a connection portion between two consecutive vane preforms through a non-woven segment of the first or the third fiber portion, provision may be made for weaving said non-woven segment of the second fiber preform portion.

This additional weaving may be performed with yarns of the first set of yarns in said non-woven segment of the second fiber preform portion being interlinked with yarns of the first set of yarns in said non-woven segment of the first or of the third preform portion.

According to a feature of the method, at its end remote from its end adjacent to the second fiber strip portion, the first fiber strip portion is extended by a fourth fiber strip portion woven over its entire length so that after being rolled up it forms an inner lining of the inner shroud.

Under such circumstances, provision may be made for the making of the fiber preform to include inwardly-folding side portions of said inner lining in order to impart a substantially channel-shaped section thereto.

According to another feature of the method, at its end remote from its end adjacent to the second fiber strip portion, the third fiber strip portion is extended by a fifth fiber strip portion that is woven along its entire length so that after being rolled up it forms an outer lining of the outer shroud.

Under such circumstances, provision may be made for the fifth fiber strip portion to be of a width that is greater than the width of the third portion, and for the making of the fiber preform to include outwardly folding at least a portion of said outer lining that projects laterally relative to the third fiber strip portion.

BRIEF DESCRIPTION OF THE DRAWINGS

The invention can be better understood on reading the following description given by way of non-limiting indication and with reference to the accompanying drawings, in which:

FIGS. 6 to 12 are diagrams showing successive steps in shaping the FIG. 3 woven strip in order to obtain a fiber preform for a compressor stator;

DETAILED DESCRIPTION OF EMBODIMENTS OF THE INVENTION

Figure 1:
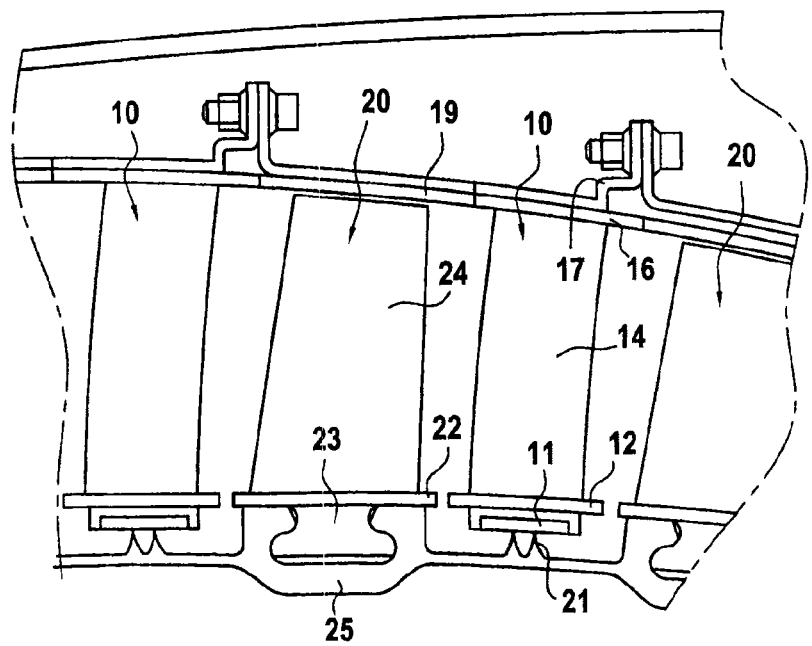
FIG. 1 is a highly diagrammatic fragmentary view of a turbine engine compressor.

FIG. 1 is a highly diagrammatic fragmentary axial half-section view showing a multistage compressor of a turbine engine. The compressor comprises stationary stators 10 alternating with rotary wheels 20.

Each stator 10 comprises an inner shroud 12, a plurality of vanes or airfoils 14, and an outer shroud 16. The vanes 14 extend substantially radially between the inner shroud 12 and the outer shroud 16 and they are angularly distributed in regular manner. At their inner and outer radial ends, the vanes 14 are secured to the respective shrouds 12 and 16. On the inside, the inner shroud 12 carries an abradable coating 11. On the outside, the outer shroud 16 is secured to a flange 17 for connection to the compressor casing, e.g. in the vicinity of its downstream end. The term "downstream" is used relative to the flow direction of air through the compressor.

Each rotary wheel 20 has blades 24 with an inner platform 22. Under the inner platform 22, each blade is extended by a root 23 engaged in a housing in a rotor 25. The rotor 25 also carries wipers 21 facing the abradable coating 11 of an adjacent stator. At their outer ends, the blades 24 may also present wipers (not shown) facing an abradable coating carried by a ring 19 supported by the compressor casing.

The outer faces of the inner shrouds 12 of the stators 10 and of the inner platforms 22 of the blades of the rotary wheel 20, and the inner faces of the outer shrouds 16 of the stators 10 and of the rings 19 define the air flow passage through the compressor, the wipers co-operating with associated abradable coatings in order to provide sealing on the inside and at the tips of the blades of the rotary wheels 20.

A compressor arrangement as described briefly above is well known.

Figure 2:
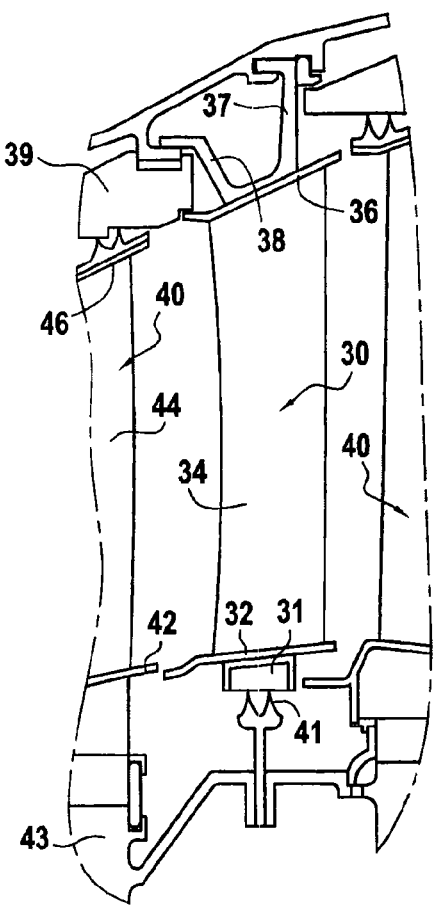
FIG. 2 is a highly diagrammatic fragmentary view of a low pressure turbine for a turbine engine.

FIG. 2 is a diagrammatic fragmentary axial half-section view showing a multistage low pressure turbine of a turbine engine. The turbine comprises stationary nozzles 30 alternating with rotary wheels 40.

Each nozzle 30 has an inner shroud 32, a plurality of vanes or airfoils 34, and an outer shroud 36. The vanes 34 extend radially between the inner shroud 32 and the outer shroud 36 and they are angularly distributed in regular manner. At their inner and outer ends, the vanes 34 are secured to the shrouds 32 and 36, respectively. On the inside, the inner shroud 32 carries an abradable coating 31. On the outside, the outer shroud 36 is secured to a flange 37 for connection with the turbine casing 39, e.g. in the vicinity of the downstream end of the shroud 36, and to a part 38 forming a centering band in the vicinity of the upstream end.

Each rotary wheel 40 has blades 44 with an inner platform 42 and an outer platform 46. Under the inner platform, each blade is extended by a root engaged in a housing in a disk 43. The disk 43 carries wipers 41 facing the abradable coating 31 of an adjacent nozzle. On the outside, the outer platforms 46 carry wipers facing an abradable coating carried by a ring 39 supported by the turbine casing.

The outer faces of the inner shrouds 32 of the nozzles 30 and of the inner platforms 42 of the blades of the rotary wheels 40, and the inner faces of the outer shroud 36 of the nozzles 30 and of the outer platforms 46 of the blades of the rotary wheels 40 define the gas flow passage through the turbine, the wipers co-operating with the associated abradable coatings to provide sealing on the inside and at the tips of the blades of the rotary wheels 40.

A low pressure turbine arrangement as described briefly above is well known.

A turbine engine part forming a compressor stator or a turbine nozzle and suitable for being used in a compressor or a turbine such as those shown in FIGS. 1 and 2, for example, can be made out of composite material with fiber reinforcement comprising yarns extending continuously through a plurality of successive vanes by passing via the inner and outer shrouds.

An embodiment of a fiber preform for such a turbine engine part, e.g. a compressor stator of shape analogous to that of a stator 10 of FIG. 1, is described below, with the final part being obtained by densifying the fiber preform with a matrix.

Figure 13:
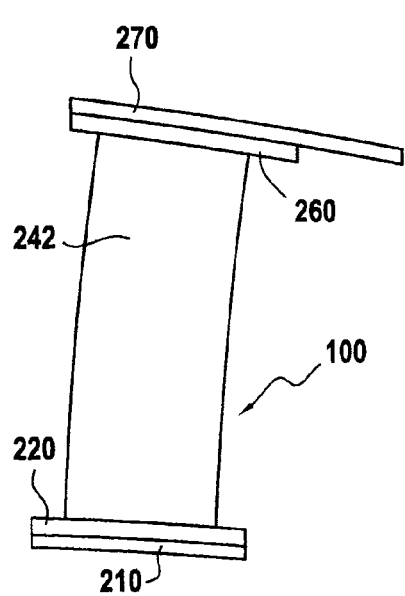
FIG. 13 is a highly diagrammatic radial half-section view at the stage of making the FIG. 12 compressor stator preform.
Figure 14:
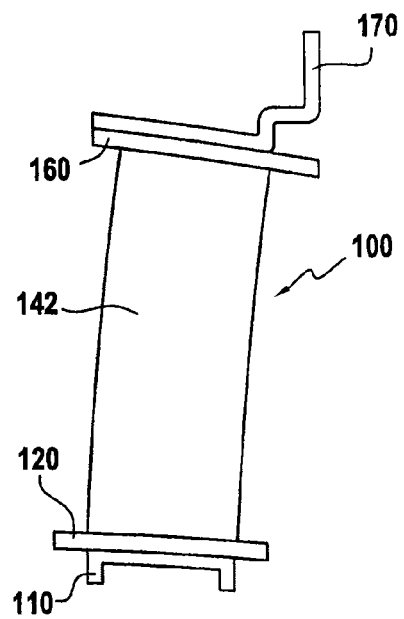
FIG. 14 is a highly diagrammatic radial half-section view of the compressor stator preform as finally obtained from the woven strip of FIG. 3.

Various operations for obtaining a fiber preform 100 as shown in FIG. 14 (described in detail below) are described with reference to FIGS. 3 to 13.

Figure 3:
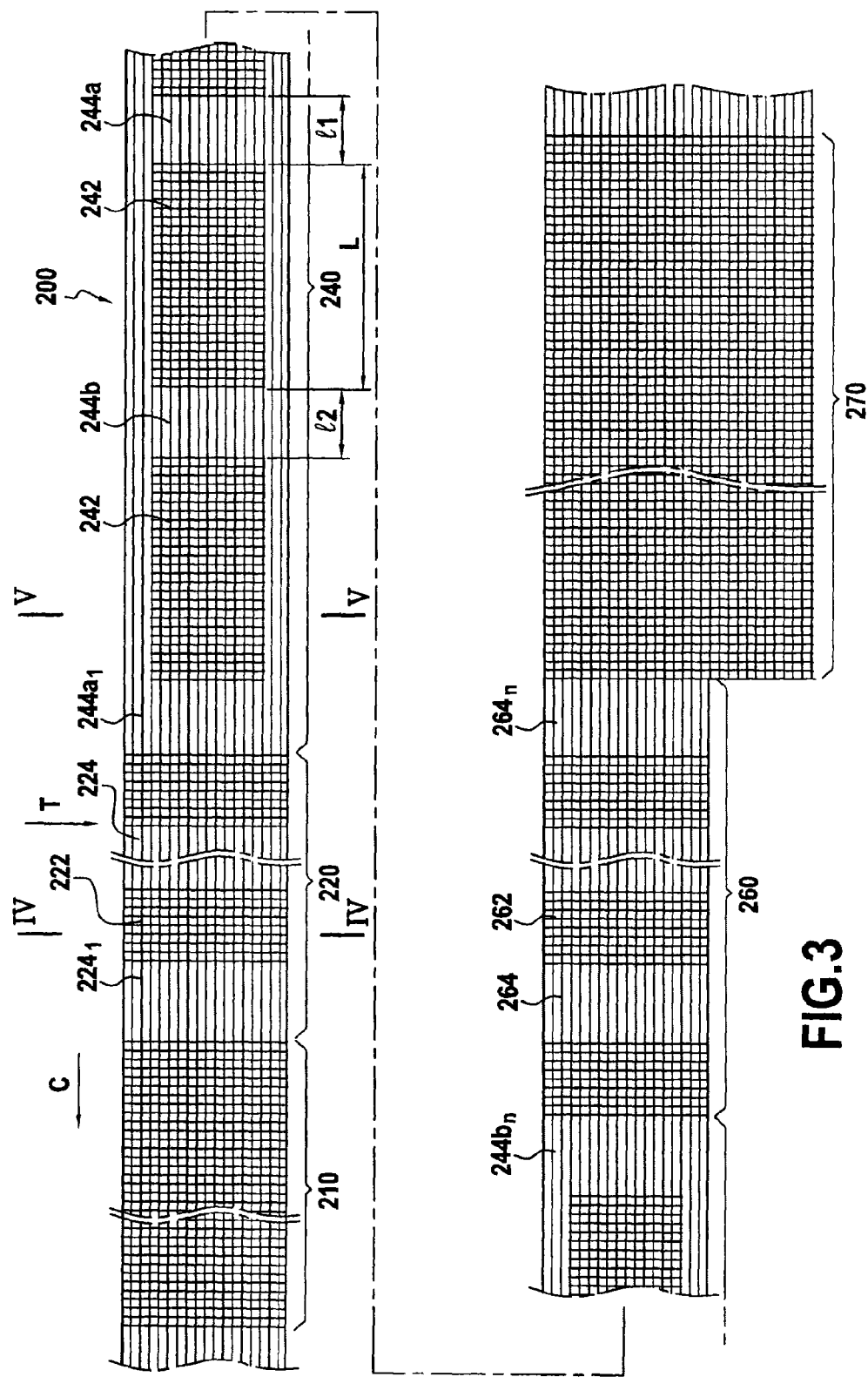
FIG. 3 is a simplified plan view of a woven fiber strip for use in making a fiber preform for a compressor stator in an embodiment of the invention.

FIG. 3 is a plan view of a woven fiber strip 200 that makes it possible, after various shaping stages, to obtain the desired fiber preform 100. In this example, the strip 200 is woven longitudinally in the warp direction (arrow C). The portions woven with weft yarns (direction T) are shown as a grid. In the other portions that are not woven only the warp yarns are shown.

The strip 200 comprises a first portion 220 for forming an inner shroud preform portion, a second portion 240 having portions that are to form the vane preform portions, and a third portion 260 that is to form an outer shroud preform portion, the portion 240 immediately extending the portion 220, while the portion 260 immediately extends the portion 240. At its longitudinal end remote from its end adjacent to the portion 240, the portion 220 may be extended immediately by a portion 210 that is to form a preform portion for internally lining the inner shroud. In similar manner, at its longitudinal end remote from its end adjacent to the portion 240, the portion 260 may be immediately extended by a portion 270 that is to form a preform portion for providing an outer lining for the outer shroud.

The strip 200 made up of the portions 210, 220, 240, 260, and 270, and once it has been shaped in the manner described below, is to constitute the fiber preform 100. Naturally, a plurality of strips 200 may be woven continuously, then being subsequently cut apart individually in order to form the preform 100.

The portions 210 and 270 are woven over their entire length, without any interruption of the weaving.

The portion 220 is made up of woven segments 222 alternating with non-woven segments 224 (i.e. segments having warp yarns only), and it has a length corresponding to the circumference of the inner shroud of the stator that is to be made. The total number of segments 222 and 224 corresponds to the number of stator vanes that are to be made. The woven segments 222 are all of the same length. Likewise, the non-woven segments 224 are all of the same length, the length of the segments 224 being substantially equal to or slightly greater than the length of the segments 222, as explained below.

The portion 240 is made up of woven segments 242 alternating with non-woven segments, which themselves alternate between segments 244a and 244b. The segments 242 are to constitute portions of vane preforms. Their number is equal to the number of stator vanes in the compressor that is to be made and they are of a length L substantially equal to the radial dimension of the vanes. The segments 244a are all of the same length £1 corresponding to the distance of the connection between two inner ends of adjacent vanes passing via the inner shroud, as explained below. The segments 244b have the same length £2 corresponding to the distance of the connection between two outer ends of adjacent vanes passing via the outer shroud, as explained below.

The portion 260 is made of woven segments 262 alternating with non-woven segments 264 and it has a length corresponding to the length of the outer shroud of the stator that is to be made. The total number of segments 262 and 264 corresponds to the number of vanes in the stator that is to be made. The segments 262 are all of the same length. Likewise, the segments 264 are all of the same length, the length of the segments 264 being substantially equal to or slightly greater than the length of the segments 262, as explained below.

The width of the portion 220 corresponds to the axial dimension of the inner shroud, while the width of the portion 260 corresponds to the axial dimension of the outer shroud, these two dimensions in the example under consideration being substantially equal.

The width of the woven segments 242 in the portion 240 corresponds to the maximum width of a vane when projected flat. In this example it is less than the widths of the portions 220 and 260, so warp yarns adjacent to the longitudinal edges of the portion 240 of the strip 200 are thus not woven.

The width of the portion 210 is substantially equal to the width of the portions 220 and 260.

The width of the portion 270 is greater than the width of the portion 260, which is obtained by adding warp yarns on one or both sides of the strip 200, depending on the profile of the preform portion that is to be made with the strip portion 270. In the example shown, warp yarns are added on one side only.

The weaving in the woven portions of the strip 200 is three-dimensional or multilayer weaving with a plurality of layers of warp yarns and a plurality of layers of weft yarns, and with the weft yarns in a given layer of weft yarns interlinking the warp yarns of a plurality of layers of warp yarns.

Figure 4:
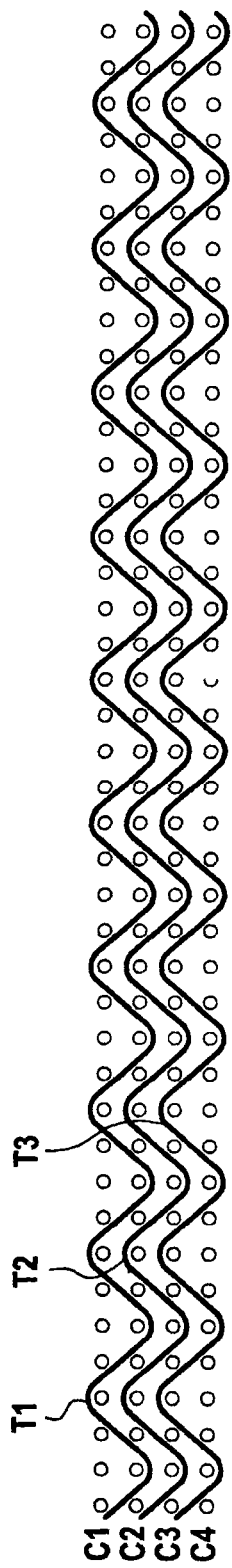
FIGS. 4 and 5 are simplified cross-section views on planes IV-IV and V-V of FIG. 3.
Figure 5:
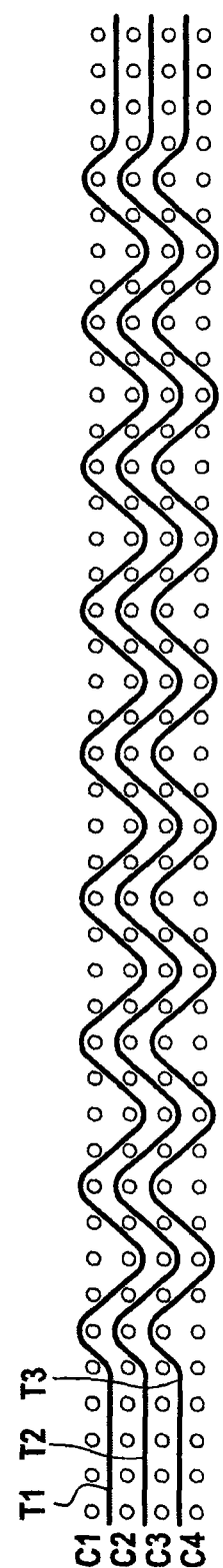
Figure 6:
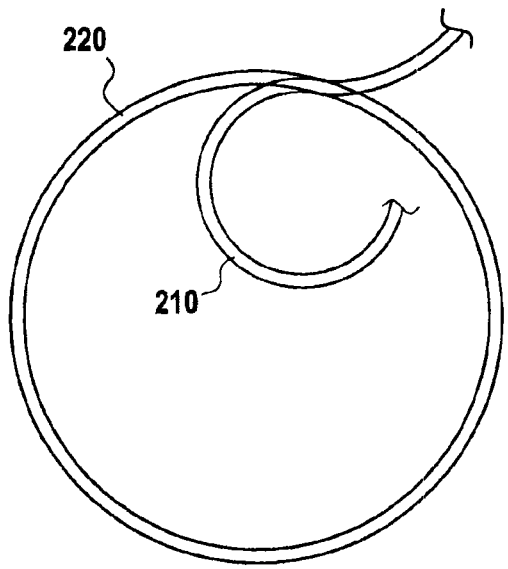
Figure 7:
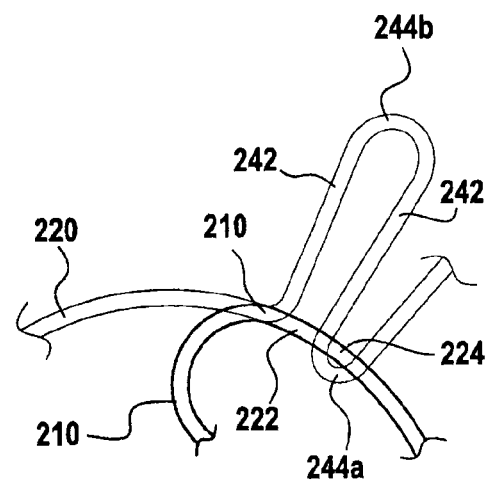
Figure 8:
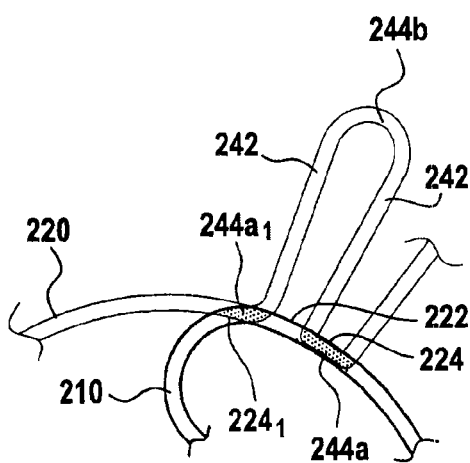
Figure 11:
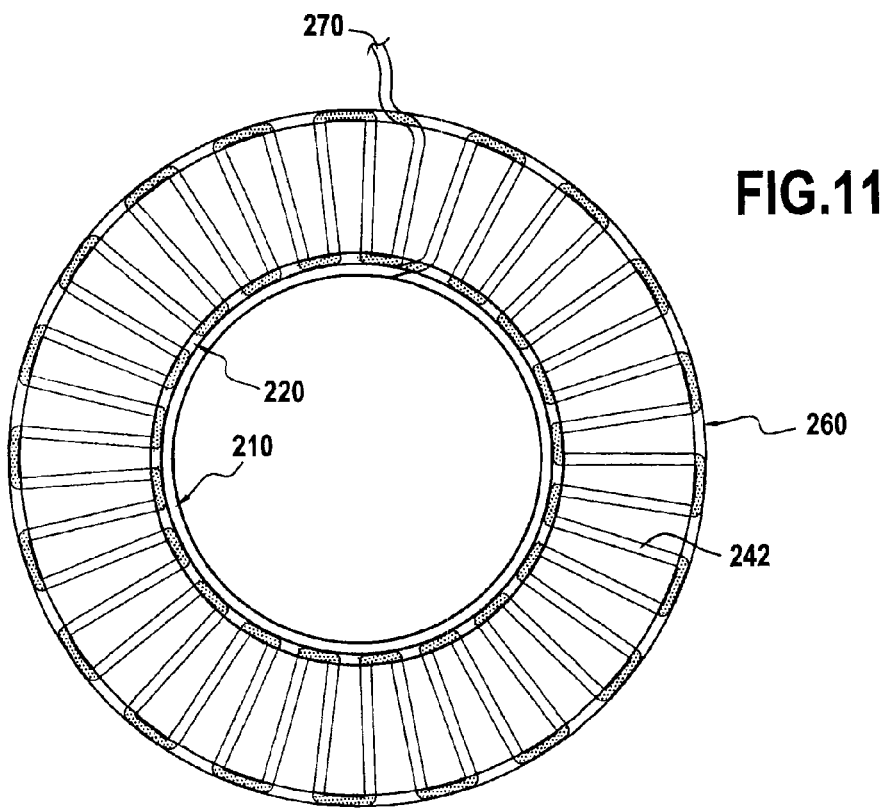
Figure 12:
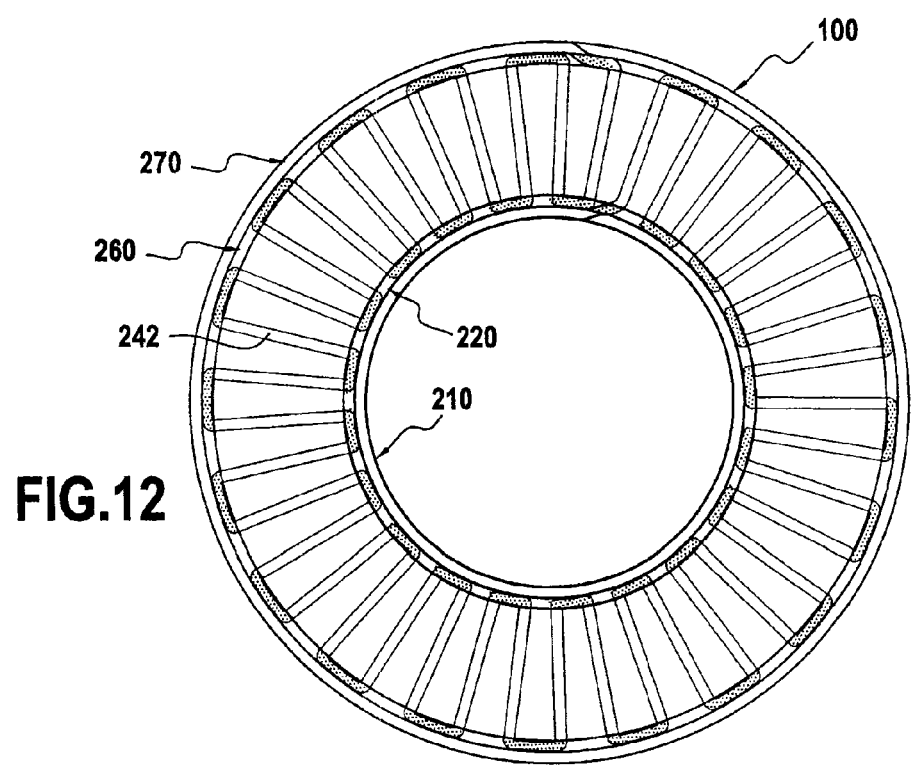

The weaving may be performed using a weave of the interlock type as shown in FIGS. 4 and 5 which show weaving planes in a woven segment 222 and in a woven segment 242, respectively. It is possible to select other multilayer weaves, e.g. multi-satin, multi-serge, or multi-plain type weaves. Reference may be made to document WO 2006/136755, the content of which is incorporated herein by way of reference. It should be observed that the weaving could also be performed using a plurality of different weaves, in particular with satin type two-dimensional weaves in the outer layers of warp yarns, at least in the portion 240, in order to give a smooth surface appearance to the vane preform portions.

In the example shown, the fiber strip 200 is woven with four layers of warp yarns C1, C2, C3, and C4, and with three layers of weft yarns T1, T2, and T3. Naturally, the number of warp yarn layers and the corresponding number of weft yarn layers could have other values depending on the thickness desired for the strip 200 for yarns of given weight. The thickness of the fiber strip 200 corresponds to the greatest thickness from among the thicknesses of the preform portions to be made. For portions preferably having a thickness that is smaller than the thickness of other portions, e.g. the vane preform portions, the weaving in the corresponding portion 240 of the strip 200 may be performed over a smaller number of warp yarns. The segments of warp yarns that extend along the entire length of the portion 240 without being woven, along its longitudinal edges (FIG. 5) and possibly also across its thickness, may be eliminated after the strip 200 has been woven and before it is shaped.

The making of a preform 100 from a woven strip 200 is described below with reference to FIGS. 6 to 12.

A first step (FIG. 6) comprises winding the portion 220 over a complete circumference while the portion 210 is rolled up in reserve.

In a second step (FIG. 7), the portion 240 is folded concertina-like all around the axis of the wound portion 220 with the woven segments 242 extending radially and the non-woven segments 244a passing through non-woven segments 224 in order to project from the inside of the wound portion 220. The woven segments 242 are to form vane preform portions.

In a third step (FIG. 8), the non-woven segments 244a, forming connections between the segments 242 on the inside, are woven so as to hold them in place relative to the wound portion 220. This additional weaving (represented by dots) is performed using weft yarns that are added using a three-dimensional or multilayer weave. Advantageously, weaving is performed that ensures that the warp yarns of various layers of warp yarns in the non-woven segments 244a are interlinked and ensuring that warp yarns of the warp yarn layers of the non-woven segments 244a and warp yarns of the warp yarn layers of the non-woven segments 224 are interlinked in order to secure the inner ends of the woven segments 242 to the portion 220, i.e. in order to secure the vane preform portions to the inner shroud preform portion. It should be observed that the rolled-up portion 220 is terminated by the first non-woven segment $224_1$ of the portion 220 (in the warp direction) interpenetrating with the first non-woven segment $244a_1$ of the portion 240, the segments $224_1$ and $244a_1$ also being subjected to additional weaving.

In the example shown, the non-woven segments 244a are completely integrated in the non-woven segments 224. This integration could be partial only, with portions of the segments 244a projecting on the inside from the portion 220.

The additional weaving of the segments 244a may be performed after the portion 240 has been folded completely, or progressively while folding is taking place.

In a fourth step (FIG. 9), the portion 260 is wound along a complete circumference, while the portion 270 is rolled up in reserve. The winding of the portion 260 is performed by causing the non-woven segments 244b of the portion 240 to pass through the non-woven segments 264 in order to project from the outside of the wound portion 260.

In a fifth step (FIG. 10), the non-woven segments 244b, forming connections between segments 242 on the outside, are woven so as to be held in place relative to the wound portion 260. In a variant, this weaving may be performed progressively while the portion 260 is being wound. This additional weaving is performed with additional weft yarns using a three-dimensional or a multilayer weave. Advantageously, weaving is performed to ensure that the warp yarns of the various layers of warp yarns in the non-woven segments 244b are interlinked and to ensure that the warp yarns of the layers of warp yarns in the non-woven segments 244b and the warp yarns of the segments of warp yarns of the non-woven segments 264 are interlinked so as to secure the outer ends of the woven segments 222 to the portion 260, i.e. so as to secure the vane preform portions to the outer shroud preform portion. It should be observed that the rolled-up portion 260 terminates with the last non-woven segment $244b_n$ of the portion 240 interpenetrating with the last non-woven segments $264_n$ of the portion 260, these two segments also being subjected to additional weaving. In the example shown, the non-woven segments 244b are completely integrated in the non-woven segments 264. This integration could be partial only, with portions of the segments 244b projecting on the outside of the portion 260.

The additional weaving in the third and fifth steps may be performed manually.

In a sixth step (FIG. 11), the portion 210 is wound along a complete circumference in contact with the wound portion 220 in order to form a preform portion constituting an inner lining for the inner shroud.

In a seventh step (FIG. 12), the portion 270 is wound along a complete circumference in contact with the wound portion 260 in order to form a preform portion constituting an outer lining for the outer shroud. Bonding, e.g. by stitching, may optionally be performed between the wound portions 210 and 220, and likewise between the wound portions 270 and 260.

FIG. 13 is a radial half-section view at this stage in the making of the fiber preform 100.

It should be observed that the shaping of the fiber strip may be performed with the assistance of support tooling, e.g. comprising rods over which the non-woven segments 244a, 244b pass while the portion 240 is being folded, which rods are removed in order to enable these non-woven segments to be subjected to the additional weaving during the third and fifth step.

The woven portions 242 that are to constitute the vane preform portions are equidistant at their inner and outer ends. Consequently, the non-woven segments 224 of the portion 220 may be slightly longer than the woven segments 222 in order to accommodate the thickness of the fiber strip 200. Likewise, in the portion 260, the non-woven segments 264 may be slightly longer than the woven segments 262 in order to accommodate the thickness of the woven strip 200. It would also be possible to make the portions 220 and 260 with woven segments having substantially the same length as the non-woven segments, the portions 220 and 260 being woven with a length that is a little shorter than their final circumference after winding and being wound with tension being exerted outwards.

Shaping is subsequently performed in shaper tooling in order to obtain the preform 100 (FIG. 14) having a shape close to that of the stator that is to be made. During this shaping, the desired profile is imparted to the vane preforms 140 corresponding to the woven portions 242, the inner lining 210 is shaped to give it a channel section for obtaining a preform portion 110 defining a housing for the abradable material on the inside of the preform portion 120 of the inner shroud, and the outer lining 270 is shaped to obtain a preform portion 170 for a fastener flange on the outside of the preform portion 160 of the outer shroud.

The width of the woven portion 210 is selected as a function of the dimensions desired for the preform portion 211. In this example it is equal to that of the portion 220. In this example the width of the portion 270 is greater than that of the portion 260 in order to be able to form the flange preform portion 170.

Figure 15:
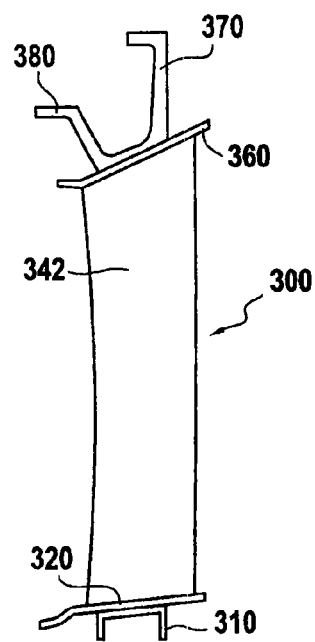
FIG. 15 is a highly diagrammatic radial half-section view of a single-piece turbine stator preform in an embodiment of the invention.

FIG. 15 shows a fiber preform 300 for a turbine nozzle having a shape that is analogous to that of a nozzle 30 as shown in FIG. 2, for example. The preform 300 is obtained by a method similar to that described above with reference to FIGS. 3 to 14. The preform 300 comprises a preform portion 310 that is to form an abradable coating housing, an inner shroud preform portion 320, nozzle vane preform portions 342, an outer shroud preform portion 360, and preform portions 370 and 380 for a fastener flange and a centering band on the outside of the outer shroud.

A compressor stator or a turbine nozzle made of composite material is finally obtained by densifying the preform 100 or 300 with a matrix. The materials constituting the fibers of the fiber preform and constituting the matrix are selected as a function of conditions of use. In a compressor stator, at least in the upstream first stages of the compressor, a composite material made with carbon or glass fibers and an organic matrix (polymer matrix) may be used. When the temperature of use is high, in particular for a turbine nozzle or for compressor stators in the downstream stages of a compressor, a ceramic matrix composite (CMC) material is used with carbon or ceramic fibers and a ceramic matrix.

Figure 16:
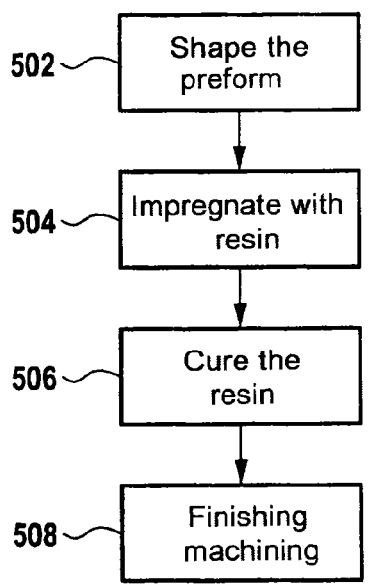
FIG. 16 shows successive steps of a method of the invention for fabricating a compressor stator out of organic matrix composite material having fiber reinforcement constituted by a fiber preform, such as that shown in FIG. 14, for example.

With a part made of organic matrix composite material (FIG. 16), the fiber strip 200 is shaped in its shaper tooling (step 502), the resulting preform is impregnated with a resin by injection or by infusion (step 504), and resin-curing heat treatment is performed (step 506). Thereafter, finishing machining may be performed (step 508) in particular on the inner and outer shrouds, on the housing for abradable material, on the fastener flange, and on the centering band. The resin is a polymer matrix precursor resin such as an epoxy resin, a bismaleimide resin, or a polyimide resin, for example.

Figure 17:
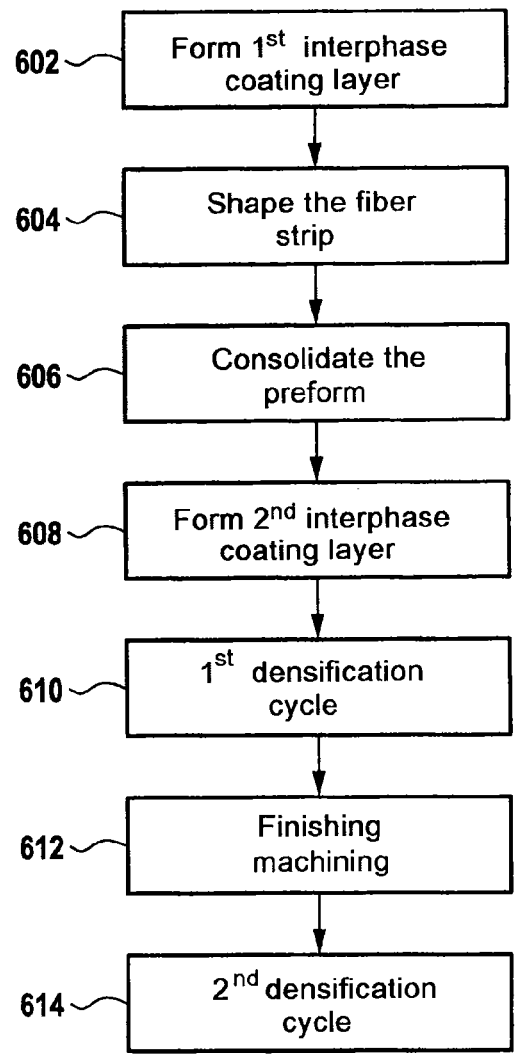
FIG. 17 shows successive steps of a method of fabricating a compressor stator or a turbine nozzle out of CMC having fiber reinforcement formed by a fiber preform as shown for example in FIG. 14 or in FIG. 15.

For a part made of CMC (FIG. 17), a thin first interphase coating layer for de-embrittlement of the CMC material is formed on the fibers of the woven fiber strip 200 (step 602) prior to shaping. The interphase coating layer, e.g. of pyrolytic carbon (PyC), of boron nitride (BN), or of boron doped carbon (BC) is formed by chemical vapor infiltration (CVI) with a thickness that is relatively small, e.g. no greater than 100 nanometers, in order to preserve the capacity of the fiber strip for being deformed.

The fiber strip 200 provided with the first interphase coating layer is shaped using shaper tooling (step 604) in order to obtain a preform such as 100 or 300. The preform is consolidated in its shape (step 606) while being held in the shaper tooling. Consolidation is performed by impregnating, by infiltration or by injection, using a carbon precursor resin, e.g. a phenolic or a ceramic resin, or a ceramic precursor resin, e.g. a polysilazane resin or a polysiloxane resin as a precursor for silicon carbon SiC. After the resin has been cured and pyrolyzed, the consolidated preform can be removed from the shaper tooling. The quantity of consolidated resin is selected so that the pyrolysis residue is sufficient, preferably only just sufficient, to bond together the fibers of the preform so that the preform can be handled while conserving it shape without assistance from support tooling.

After consolidation, a second interphase coating layer may be formed by CVI (step 608) in order to obtain an overall fiber-matrix interphase that is of sufficient thickness to perform the de-embrittling function for the CMC material, the second interphase coating layer being constituted for example by PyC, BN, or BC, and having thickness that is preferably not less than 100 nanometers.

Thereafter, densification with a ceramic matrix is performed. The densification may be performed by CVI. By way of example, the matrix may be made of SiC or it may be a self-healing matrix, e.g. comprising matrix phases of a ternary Si—B—C system or of boron carbide $B_4C$.

Documents U.S. Pat. No. 5,246,736 and U.S. Pat. No. 5,965,266 describe how CVI can be used to obtain such healing matrices. The CVI densification may be performed in two cycles 610 and 614 separated by a step 612 of performing finishing machining on the part.

A method of the type described above with reference to FIG. 17 is itself known. Reference may be made to document US 2010/0015428, the content of which is incorporated herein by way of reference, and to document WO 2010/103213 which describes such a method for fabricating a turbine ring assembly out of CMC.

The single-piece part obtained after densification may be used as such as a complete compressor stator or as a complete turbine nozzle. In a variant, in particular for a turbine nozzle, the part may be cut into sectors, each comprising an inner shroud sector, an outer shroud sector, and at least two vanes, or possibly at least three vanes, when that is required, in particular for facilitating assembly.

Thus, both with a single-piece part and with sectors, the invention is remarkable in that the way in which the preform is made enables fiber reinforcing yarns to be continuous along a path that runs longitudinally through at least two consecutive vanes by passing through the inner shroud and the outer shroud, or passing longitudinally through at least three consecutive vanes by passing in alternation through the inner shroud and through the outer shroud, with such continuity contributing to imparting a high degree of mechanical strength. There is also fiber reinforcing yarn continuity along the inner and outer shroud segments between which the at least two or at least three consecutive blades extends.

For a part forming a single-piece compressor stator or turbine nozzle, the fiber reinforcement comprises yarns that extend continuously along a part traveling along one of the inner or outer shrouds around its circumference and then in succession through all of the vanes, passing from one to another in alternation via the outer shroud and the inner shroud, and then traveling along the other shroud.

The invention claimed is:

1. A turbine engine part forming a compressor stator or a turbine nozzle comprising:
    an inner shroud;
    an outer shroud; and
    vanes extending substantially radially between the inner and outer shrouds and secured thereto,
    wherein the inner shroud, the outer shroud, and the vanes are made of composite material having woven fiber reinforcement densified by a matrix, and the fiber reinforcement includes a set of yarns extending continuously along a path traveling longitudinally through at least two consecutive vanes and passing through the inner shroud and the outer shroud,
    the at least two consecutive vanes extending between an inner shroud segment and an outer shroud segment with yarns of the woven fiber reinforcement passing continuously along a complete circumference of the inner shroud segment and with yarns of the woven fiber reinforcement passing continuously along a complete circumference of the outer shroud segment.

2. A turbine engine part according to claim 1, wherein the fiber reinforcement includes a set of yarns extending continuously along a path passing longitudinally through at least three consecutive vanes and passing in alternation through the inner shroud and the outer shroud, the at least three consecutive vanes extending between the inner shroud segment and the outer shroud segment with yarns of the woven fiber reinforcement extending continuously in the circumferential direction along the inner shroud segment and with yarns of the woven fiber reinforcement extending continuously in the circumferential direction along the outer shroud segment.

3. A turbine engine part according to claim 1, wherein the inner shroud, the outer shroud, and the vanes form a single part made of composite material.

4. A turbine engine part according to claim 3, wherein the fiber reinforcement includes a set of yarns extending continuously along a path passing along one of the inner and outer shrouds along its circumference, and then successively through all of the vanes, and then along the other one of the inner and outer shrouds along its circumference.

5. A turbine engine part according to claim 1, formed of a plurality of sectors, each sector forming a single part of composite material having an inner shroud sector, an outer shroud sector, and at least two vanes extending between the shroud sectors and secured thereto.

6. A turbine engine part according to claim 1, formed of a plurality of sectors, each sector forming a single part of composite material having an inner shroud sector, an outer shroud sector, and at least three vanes extending between the shroud sectors and secured thereto.

7. A turbine engine part according to claim 1, further comprising at least one flange secured to the outer shroud and extending radially outwards therefrom.

8. A turbine engine part according to claim 1, further comprising a portion secured to the inner shroud and defining on the inside thereof a housing of substantially channel section that is open towards the inside.

9. A turbine engine part according to claim 1, made of ceramic matrix composite material.

10. A turbine engine part according to claim 1, wherein the fiber reinforcement includes a first set of yarns which is the set of yarns extending continuously along the path traveling longitudinally through at least two consecutive vanes and passing through the inner shroud and the outer shroud, and a second set of yarns woven with the yarns of the first set of yarns along woven segments of the fiber reinforcement that are separated from one another by non-woven segments, the fiber reinforcement including
    a first fiber reinforcement portion extending over a length corresponding to a total length of the inner shroud, the first fiber reinforcement portion including woven segments alternating with non-woven segments;
    a second fiber strip portion immediately following the first fiber reinforcement portion and including woven segments alternating with non-woven segments, the woven segments of the second fiber reinforcement portion having a length corresponding to a longitudinal dimension of the vanes, and the non-woven segments of the second fiber strip portion forming connection portions between consecutive vane preforms; and
    a third fiber reinforcement portion immediately following the second fiber reinforcement portion and extending over a length corresponding to a total length of the outer shroud, the third fiber reinforcement portion including woven segments alternating with non-woven segments, and
    wherein a total number of woven and non-woven segments in each of the first and third fiber reinforcement portions are equal to the number of vanes.

11. A method of fabricating a turbine engine part forming a compressor stator or a turbine nozzle, the part including an inner shroud, an outer shroud, and vanes extending substantially radially between the inner and outer shrouds and being secured thereto, the method comprising:
    making a woven fiber preform including a first set of yarns that pass continuously along a complete circumference of a first preform portion forming a preform for the inner shroud, and
    then successively in a longitudinal direction along second preform portions forming vane preforms, and also along a complete circumference a third preform portion forming an outer shroud preform, the yarns of the first set of yarns passing in succession along the second preform portions by passing from one second preform portion to the next in alternation through the first preform portion and through the third preform portion; and densifying the fiber preform with a matrix.

12. A method according to claim 11, wherein the making of the fiber preform comprises:
   1) weaving a fiber strip with a first set of yarns extending continuously in a longitudinal direction of the strip and including a plurality of layers of parallel yarns, and a second set of yarns woven with the yarns of the first set along woven segments of the fiber strip that are separated from one another by non-woven segments, the fiber strip including:
      a first fiber strip portion extending over a length corresponding to a length of the first preform portion, the first fiber strip portion including woven segments alternating with non-woven segments;
      a second fiber strip portion immediately following the first portion and including woven segments alternating with non-woven segments, the woven segments of the second fiber strip portion corresponding to the second preform portions and having a length corresponding to a longitudinal dimension of the vanes, and the non-woven segments of the second fiber strip portion forming connection portions between consecutive vane preforms; and
      a third fiber strip portion immediately following the second portion and extending over a length corresponding to a length of the third preform portion, the third fiber strip portion including woven segments alternating with non-woven segments;
      a total number of woven and non-woven segments in each of the first and third portions being equal to the number of vanes; and
   2) shaping the fiber strip, including:
      rolling up the first fiber strip portion;
      folding the second fiber strip portion to place its woven segments substantially radially relative to the rolled-up first fiber strip portion; and
      rolling up the third fiber strip portion;
      the non-woven segments of the second fiber strip portion that form connection portions between consecutive vane preforms being engaged through the non-woven segments in alternation in the rolled-up first fiber strip portion and in the rolled-up third fiber strip portion.

13. A method according to claim 12, wherein, after engaging a non-woven segment of the second fiber strip portion forming a connection portion between two consecutive vane preforms through a non-woven segment of the first or the third fiber portion, the non-woven segment of the second fiber preform portion is woven.

14. A method according to claim 13, wherein the weaving is performed with yarns of the first set of yarns in the non-woven segment of the second fiber preform portion being interlinked with yarns of the first set of yarns in the non-woven segment of the first or of the third preform portion.

15. A method according to claim 12, wherein, at an end of the third fiber strip portion remote from an end adjacent to the second fiber strip portion, the third fiber strip portion is extended by a fifth fiber strip portion that is woven over an entire length so that after being rolled up the fifth fiber strip portion forms an outer lining of the outer shroud.

16. A method according to claim 15, wherein the fifth fiber strip portion is of a width that is greater than a width of the third portion, and the making of the fiber preform includes outwardly folding at least a portion of the outer lining that projects laterally relative to the third fiber strip portion.

17. A method according to claim 11, wherein, at an end of the first fiber strip portion remote from an end adjacent to the second fiber strip portion, the first fiber strip portion is extended by a fourth fiber strip portion woven over an entire length so that after being rolled up the fourth fiber strip portion forms an inner lining of the inner shroud.

18. A method according to claim 17, wherein the making of the fiber preform includes inwardly-folding side portions of the inner lining to impart a substantially channel-shaped section thereto.

* * * * *